United States Patent
Nunn et al.

(10) Patent No.: US 12,032,707 B2
(45) Date of Patent: Jul. 9, 2024

(54) SECURE DIGITAL RECORD WITH IMPROVED DATA UPDATE AND SHARING

(71) Applicant: Bank of America Corporation, Charlotte, NC (US)

(72) Inventors: Daniel John Nunn, Bracknell (GB); Isha Nasreen Nawaz, Chester (GB)

(73) Assignee: Bank of America Corporation, Charlotte, NC (US)

( * ) Notice: Subject to any disclaimer, the term of this patent is extended or adjusted under 35 U.S.C. 154(b) by 453 days.

(21) Appl. No.: 17/451,103

(22) Filed: Oct. 15, 2021

(65) Prior Publication Data

US 2023/0123691 A1 Apr. 20, 2023

(51) Int. Cl.
*G06F 21/60* (2013.01)
*H04L 9/08* (2006.01)
*H04L 9/40* (2022.01)
*G06F 3/04847* (2022.01)
*H04L 9/00* (2022.01)

(52) U.S. Cl.
CPC .......... *G06F 21/602* (2013.01); *H04L 9/0819* (2013.01); *H04L 63/08* (2013.01); *G06F 3/04847* (2013.01); *H04L 9/50* (2022.05)

(58) Field of Classification Search
CPC .................................................... G06F 21/602
USPC ........................................................ 713/153
See application file for complete search history.

(56) References Cited

U.S. PATENT DOCUMENTS

| 7,181,017 | B1* | 2/2007 | Nagel ............... H04L 9/302 |
| | | | 380/282 |
| 9,584,517 | B1* | 2/2017 | Roth ............... G06F 21/602 |
| 9,910,999 | B1* | 3/2018 | Yu ............... G06F 21/6254 |
| 10,803,022 | B2 | 10/2020 | Ramabaja |
| 10,833,865 | B2 | 11/2020 | Kelly |
| 10,972,942 | B2 | 4/2021 | Ibek et al. |
| 10,979,227 | B2 | 4/2021 | Ebrahimi |
| 10,979,414 | B2 | 4/2021 | Kursun |
| 10,992,454 | B2 | 4/2021 | Nazarian et al. |
| 10,997,142 | B2 | 5/2021 | Cuomo et al. |
| 11,023,423 | B2 | 6/2021 | Glasser |
| 11,025,409 | B1 | 6/2021 | Fields et al. |
| 11,025,435 | B2 | 6/2021 | Li et al. |
| 11,032,064 | B2 | 6/2021 | Sardesai et al. |
| 11,037,246 | B1 | 6/2021 | Leise et al. |
| 11,038,670 | B2 | 6/2021 | Li et al. |
| 11,048,813 | B2 | 6/2021 | Pitti |
| 11,095,431 | B2 | 8/2021 | Srivastava |
| 11,095,446 | B2 | 8/2021 | Monica et al. |
| 11,121,877 | B2 | 9/2021 | Guillama et al. |
| 11,122,052 | B2 | 9/2021 | Zamora Duran et al. |

(Continued)

*Primary Examiner* — Dant B Shaifer Harriman

(57) ABSTRACT

A system includes a network device with a memory operable to store a secure data record that includes a plurality of secure data entries and a processor communicatively coupled to the memory. A first entry is generated in the secure data record that includes encrypted received data and a first key. A second key is provided to a user device in communication with the network device. The user device causes presentation of a user interface with one or more selectable file names, corresponding to data entries of the secure data record. An input is received corresponding to a selection of a first file of the one or more selectable files. The second key and a request for the first file are provided to the network device. The first file is then presented in the user interface.

20 Claims, 4 Drawing Sheets

(56) References Cited

U.S. PATENT DOCUMENTS

| | | |
|---|---|---|
| 11,139,954 B2 | 10/2021 | Mercuri et al. |
| 11,139,976 B2 | 10/2021 | Khan |
| 11,146,384 B2 | 10/2021 | Huan et al. |
| 11,146,541 B2* | 10/2021 | Roth ................ H04L 63/06 |
| 11,146,546 B2 | 10/2021 | Caldera et al. |
| 2008/0010449 A1* | 1/2008 | Holtzman ............. G06F 21/79 |
| | | 713/157 |
| 2012/0124386 A1* | 5/2012 | Lin ................. G06F 21/6218 |
| | | 726/17 |
| 2013/0318462 A1* | 11/2013 | Masuda ........... H04N 21/43615 |
| | | 715/771 |
| 2016/0261658 A1* | 9/2016 | Taylor ................ H04L 65/612 |
| 2017/0034197 A1 | 2/2017 | Daniel et al. |
| 2018/0285839 A1 | 10/2018 | Yang et al. |
| 2018/0332054 A1 | 11/2018 | Ford |
| 2019/0007424 A1 | 1/2019 | Ford et al. |
| 2019/0028277 A1* | 1/2019 | Jayachandran ....... H04L 9/3247 |
| 2019/0036932 A1 | 1/2019 | Bathen et al. |
| 2019/0147532 A1 | 5/2019 | Singh et al. |
| 2020/0007311 A1 | 1/2020 | Oberhofer et al. |
| 2020/0027162 A1 | 1/2020 | Singh et al. |
| 2020/0043045 A1* | 2/2020 | Jurich, Jr. ............. G06Q 20/405 |
| 2020/0045051 A1 | 2/2020 | Bathen et al. |
| 2020/0084097 A1 | 3/2020 | Marks et al. |
| 2020/0112438 A1 | 4/2020 | Allen et al. |
| 2020/0242717 A1 | 7/2020 | Agarwal et al. |
| 2020/0250295 A1 | 8/2020 | Padmanabhan |
| 2021/0056230 A1* | 2/2021 | Khassanov ........... H04L 9/0825 |
| 2021/0160309 A1 | 5/2021 | Destefanis et al. |
| 2021/0182861 A1 | 6/2021 | Davis |
| 2021/0201326 A1 | 7/2021 | Ambikapathi |
| 2021/0218549 A1* | 7/2021 | Huang ................ H04L 9/0861 |
| 2021/0232547 A1 | 7/2021 | Ramabaja |
| 2021/0390190 A1* | 12/2021 | Walker ............... G06Q 30/0236 |

* cited by examiner

SECURE DIGITAL RECORD WITH IMPROVED DATA UPDATE AND SHARING

TECHNICAL FIELD

The present disclosure relates generally to technologies for securing digital information. More particularly, in certain embodiments, the present disclosure is related to a secure digital record with improved data update and sharing.

BACKGROUND

Information may be stored in a digital form such that it may be communicated electronically to entities needing to review the information. Information associated with a given purpose or user may be distributed amongst a number of separate locations or repositories, for example, on different network servers and in different user devices.

SUMMARY

Previous technology fails to provide efficient, reliable, and secure tools for managing information for a given purpose or user. For example, a given entity, such as a company, organization, or person, may have important data stored in a number of servers and/or in different devices (e.g., smart phones, personal computers, etc.). Previous technology fails to provide a technique for securely and efficiently managing records of such information. Moreover, if a given piece of information is needed, previous technology lacks tools for efficiently retrieving this information. Previous technology also fails to facilitate secure and reliable sharing and updating of such information.

Certain embodiments of this disclosure may be integrated into the practical application of a data security system that provides improvements to previous technology, including those identified above. The data security system facilitates the efficient and secure management of data for a given purpose or entity (e.g., an organization, user, or the like). For example, the disclosed system and associated devices provide several technical advantages over previous data security technology, which include: (1) the ability to securely and reliably store data from a range of possible sources in an easily accessible and secure data record; (2) the ability to efficiently and securely share selected portions of data stored in a secure data record; (3) the ability to reliably update and/or add new data from a variety of sources, including specially trusted sources, such that data is consistently up to date and reliable; and (4) the ability to maintain a record of events that provides a history of the usage (e.g., sharing, storage, etc.) of securely stored data. Through these technical improvements, the disclosed system and associated devices provide more secure and reliable data that is also accessible in a more user friendly manner. Also through these technical improvements, this disclosure may improve the function of computer systems used for data security, data management, and data sharing by improving, for example, the security, efficiency, and ease-of-use of such computer systems. Certain embodiments of this disclosure may include some, all, or none of these advantages. These advantages and other features will be more clearly understood from the following detailed description taken in conjunction with the accompanying drawings and claims.

In an embodiment, a system includes a network device with a memory operable to store a secure data record that includes a plurality of secure data entries and a processor communicatively coupled to the memory. The network device receives data for storing in the secure data record and corresponding authentication evidence. The network device determines, based on the authentication evidence, that the received data is authentic. After determining that the received data is authentic, the received data is encrypted and a first key and second key are generated for decrypting the encrypted received data. A first entry (e.g., a block in a blockchain) is generated in the secure data record. The first entry includes the encrypted received data and the first key. The second key is provided to a user device in communication with the network device. The user device causes presentation of a user interface with one or more selectable file names corresponding to data entries of the secure data record. An input is received corresponding to a selection of a first file of the one or more selectable files. The first file corresponds to at least a portion of the encrypted received data stored in the first entry of the secure data record. The second key and a request for the first file are provided to the network device. The first file is then presented (e.g., as illustrated in FIG. 4C).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
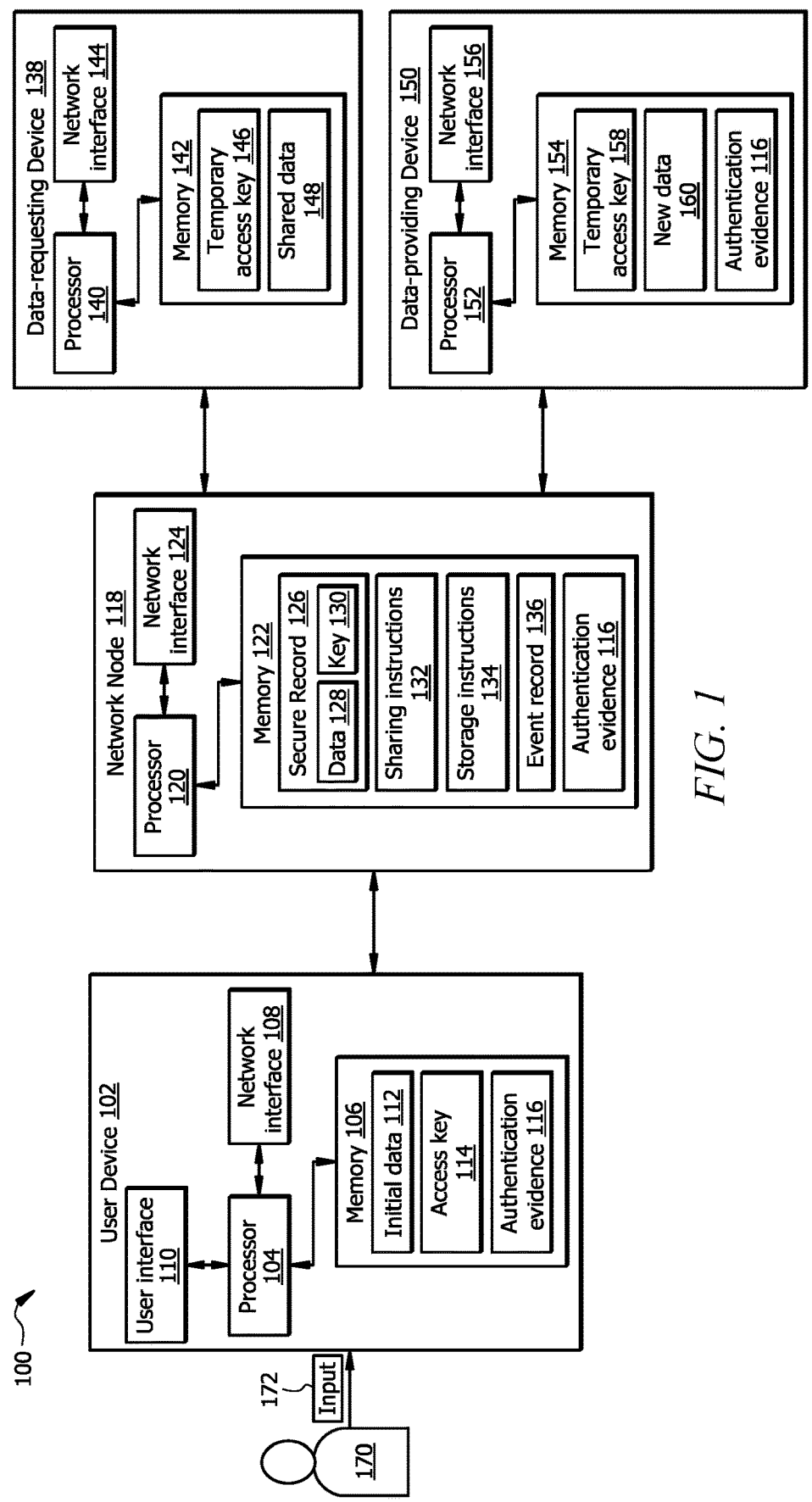
FIG. 1 is a diagram of an example data security system.
Figure 2:
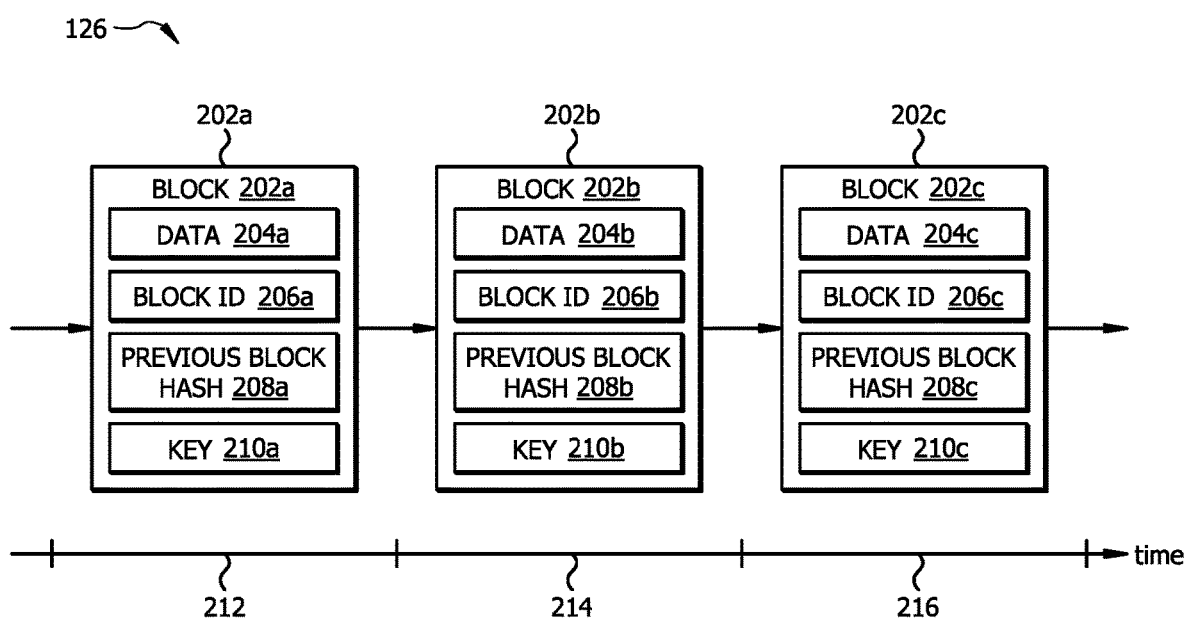
FIG. 2 is diagram illustrating an example secure data record of the system of FIG. 1.
Figure 3:
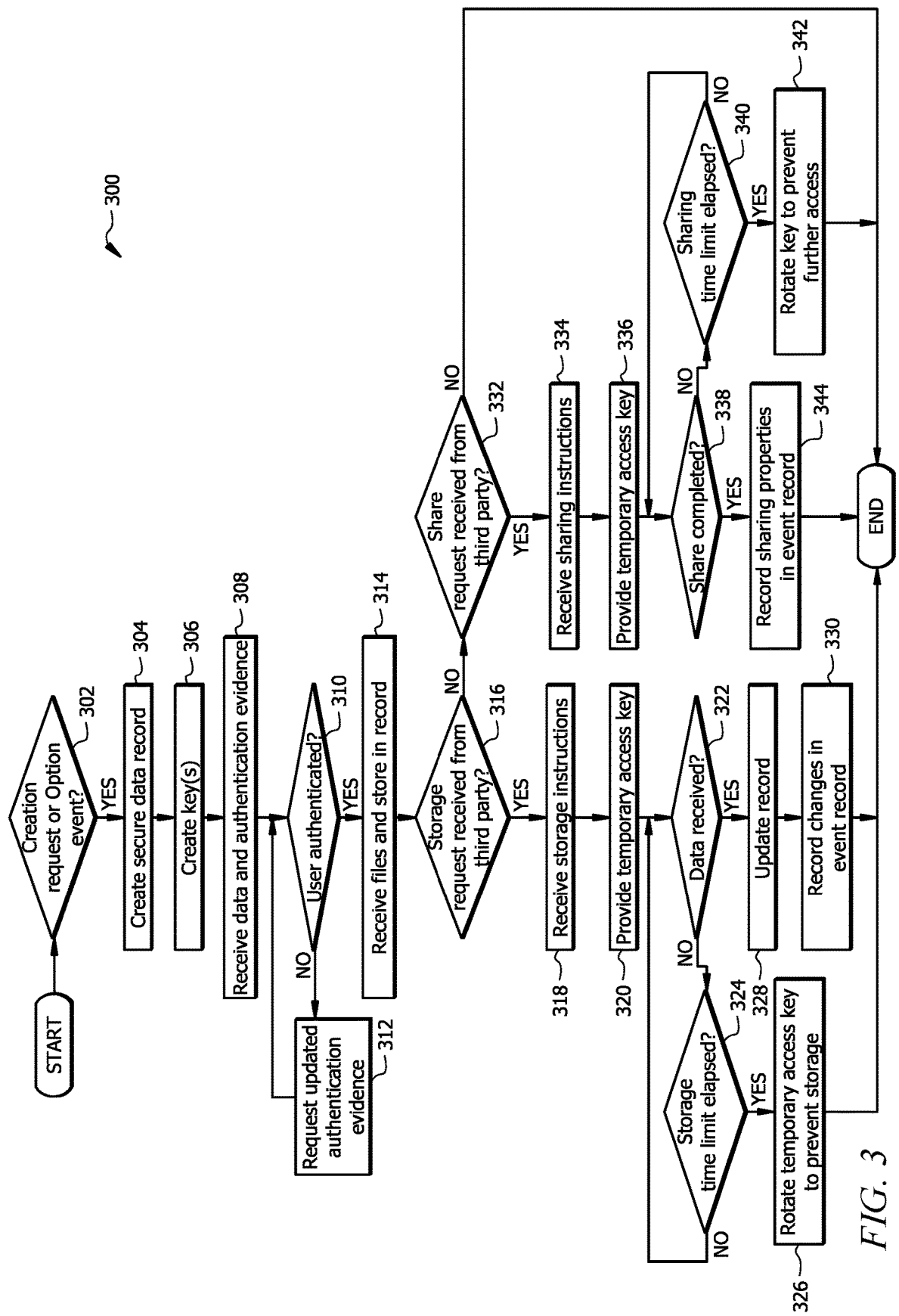
FIG. 3 is a flowchart illustrating an example method of operating the system of FIG. 1.
Figures 4A, 4B, 4C:
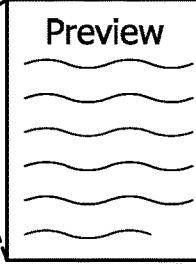
FIG. 4A is a diagram illustrating an example presentation within the user interface of the system of FIG. 1 for authorizing the storage of new data in a secure data record.
FIG. 4B is a diagram illustrating an example presentation within the user interface of the system of FIG. 1 for authorizing sharing of data from a secure data record.
FIG. 4C is a diagram illustrating an example presentation within the user interface of the system of FIG. 1 for reviewing securely stored data and associated properties determined by the system of FIG. 1.

This disclosure provides solutions to the aforementioned and other problems of previous technology by providing a data security system that improves information security while also providing improved efficiency and user experience. The data security system may provide a secured data record where information from a range of sources (e.g., a user, various third parties, etc.) can be securely stored, managed, and shared. An example of such a system is illustrated in FIG. 1. An example secure data record that can be created, managed, and/or shared using the system is illustrated in FIG. 2. An example method of operating the system is illustrated in FIG. 3. FIGS. 4A-C illustrate different information presented in a user interface for interacting with (e.g., updating, sharing, viewing, analyzing, etc.) securely stored data.

Example Secure Data Management System

FIG. 1 illustrates an example data security system 100. The data security system 100 includes one or more user devices 102, network devices (or nodes) 118, data-requesting devices 138, and data-providing devices 150. The data security system 100 generally facilitates improved information accessibility and security by generating a secure data record 126 with data 128 and information, such as key(s) 130, for securing the data 128, as described in greater detail below.

The user device 102 is generally any appropriate device for facilitating interaction between a user 170 and information stored in the secure data record 126. For example, the user device 102 may be a smartphone, a computer, a tablet, or the like. The user device 102 includes a processor 104, memory 106, and a network interface 108. The processor 104 is configured to present a user interface 110 (e.g., on a display of the user device 102). The user interface 110 can present fields for indicating which data 128 the user 170 wants to view and presents the data 128 stored in the secure data record 126 (see FIG. 4C and corresponding description below). In some cases, the user interface 110 may receive input 172 indicating how information in the secure data record 126 should be shared and/or updated. Examples of information presented in the user interface 110 are described in greater detail below with respect to the examples of FIGS. 4A-C.

The processor 104 of the user device 102 includes one or more processors. The processor 104 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 104 may be a programmable logic device, a microcontroller, a microprocessor, or any suitable combination of the preceding. The processor 104 is communicatively coupled to and in signal communication with the memory 106 and network interface 108. The one or more processors are configured to process data and may be implemented in hardware and/or software. For example, the processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory 106 and executes them by directing the coordinated operations of the ALU, registers and other components.

The memory 106 of the user device 102 is operable to store any data, instructions, logic, rules, or code operable to execute the functions of the user device 102. The memory 106 may store initial data 112, an access key 114, and/or authentication evidence 116. Initial data 112 may be one or more initial data files that are provided when a secure data record 126 is created for a given purpose or user 170. For example, when user 170 requests to create a secure data record 126, initial data 112 may be provided to the network device(s) 118 to create the secure data record 126. The access key 114 allows access to at least the portion of the secure data record 126 that is associated with the user 170, or to which the user 170 has otherwise been granted access. The access key 114 may be an appropriate decryption key for viewing data 128 to which the user 170 has access. The authentication evidence 116 may be information (e.g., in the form of a data file, an image, an alphanumeric string, or the like) that can be used to verify the identity of the user 170. For example, authentication evidence 116 may include an identification number, date of birth, and/or the like. As described further below, in some cases, authentication evidence 116 may, in some cases, be provided by a trusted third party (e.g., associated with data-providing device 150), such that security may be further improved by ensuring the authentication evidence 116 is legitimate before data storing, sharing, etc. is allowed to proceed. The memory 106 includes one or more disks, tape drives, or solid-state drives, and may be used as an over-flow data storage device, to store programs when such programs are selected for execution, and to store instructions and data that are read during program execution. The memory 106 may be volatile or non-volatile and may comprise read-only memory (ROM), random-access memory (RAM), ternary content-addressable memory (TCAM), dynamic random-access memory (DRAM), and static random-access memory (SRAM).

The network interface 108 of the user device 102 is configured to enable wired and/or wireless communications. The network interface 108 is configured to communicate data between the user device 102 and other network devices, systems, or domain(s), such as network device(s) 118. The network interface 108 is an electronic circuit that is configured to enable communications between devices. For example, the network interface 108 may include one or more serial ports (e.g., USB ports or the like) and/or parallel ports (e.g., any type of multi-pin port) for facilitating this communication. As a further example, the network interface 108 may include a WIFI interface, a local area network (LAN) interface, a wide area network (WAN) interface, a modem, a switch, or a router. The processor 104 is configured to send and receive data using the network interface 108. The network interface 108 may be configured to use any suitable type of communication protocol as would be appreciated by one of ordinary skill in the art. The network interface 108 communicates initial data 112 and/or authentication evidence 116 to the network device(s) 118 to create and/or update the secure data record 126 and communicates access key 114 to view entries in the secure data record 126 (e.g., via the user interface 110, as illustrated in the example of FIG. 4C, described below).

The network devices 118 generally act as nodes of network used to store the secure data record 126. In some cases, the user device 102 may be configured to perform all or a portion of the functions of a network device 118. The secure data record 126 stores data 128 and key(s) 130. The data 128 may be any files or other digitally stored information pertaining to a given purpose or user 170. For example, data 128 may include identification information for a user 170, historical information of the user 170 (e.g., work history, educational record, etc.), and any other information a user 170 may want to store in the secure data record 126. The key(s) 130 are generally information for controlling access to data 128. For example, a key 130 may be used in combination with a user's access key 114 to view a given entry of data 128. The network devices 118 may include sharing instructions 132 that provide rules for securely sharing portions of the securely stored data 128 (see, e.g., steps 332 to 344 of FIG. 3 and FIG. 4B) and/or storage instructions 134 for securely updating the secure data record 126 (see, e.g., steps 316 to 330 of FIG. 3 and FIG. 4A). An event record 136 may be maintained over the lifetime of the secure data record 126 in order to provide insights into how the data record 126 changes and is used over time. For example, the event record 136 may include a record of the storage of data 128 in the secure data record 126 (e.g., when and by whom data 128 is added to the secure data record 126) and sharing of data 128 from the secure data record 126 (e.g., when and with whom data 128 is shared). When data 128 is viewed in the user interface 110 of the user device 102, information from the event record 136 may also be presented (see, e.g., the example of FIG. 4C). Authentication evidence 116 received from a user device 102 and/or a data-providing device 150 may be used to authenticate creation of a secure data record 126, changes to a secure data record 126, and/or sharing of the secure data record 126.

Each network device 118 generally includes a processor 120, memory 122, and network interface 124. The processor 120 of each network device 118 includes one or more processors. The processor 120 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 120 may be a programmable logic device, a microcontroller, a microprocessor, or any suitable combination of the preceding. The processor 120 is communicatively coupled to and in signal communication with the memory 122 and network interface 124. The one or more processors are configured to process data and may be implemented in hardware and/or software. For example, the processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory 122 and executes them by directing the coordinated operations of the ALU, registers and other components.

The memory 122 of each network device 118 is operable to store any data, instructions, logic, rules, or code operable to execute the functions of the network device 118. The memory 122 may store the secure data record 126, sharing instructions 132, storage instructions 134, event record 136, authentication evidence 116, and/or any other logic, code, and/or rules for implementing the functions of the network device 118. The memory 122 includes one or more disks, tape drives, or solid-state drives, and may be used as an over-flow data storage device, to store programs when such programs are selected for execution, and to store instructions and data that are read during program execution. The memory 122 may be volatile or non-volatile and may comprise read-only memory (ROM), random-access memory (RAM), ternary content-addressable memory (TCAM), dynamic random-access memory (DRAM), and static random-access memory (SRAM).

The network interface 124 of each network device 118 is configured to enable wired and/or wireless communications. The network interface 124 is configured to communicate data between the network device 118 and other network devices 118 as well as with the user device 102, and devices 138, 150. The network interface 124 is an electronic circuit that is configured to enable communications between devices. For example, the network interface 124 may include one or more serial ports (e.g., USB ports or the like) and/or parallel ports (e.g., any type of multi-pin port) for facilitating this communication. As a further example, the network interface 124 may include a WIFI interface, a local area network (LAN) interface, a wide area network (WAN) interface, a modem, a switch, or a router. The processor 120 is configured to send and receive data using the network interface 124. The network interface 124 may be configured to use any suitable type of communication protocol as would be appreciated by one of ordinary skill in the art. The network interface 124 receives initial data 112, access key 114, authentication evidence 116, temporary access keys 146, 158, and new data 160 and communicates data 128 and/or information from the event record 136.

As described briefly above, the secure data record 126 may be stored as a blockchain or distributed ledger, as described further with respect to FIG. 2 below. When the network device 118 publishes an entry in the secure data record 126 (e.g., a new block 202*a-c* as illustrated in FIG. 2), the secure data record 126 for every other network device 118 in the network is also updated with the entry. This allows data published in a blockchain to be available and accessible to every network device 118 and other devices in communication with the network devices 118 (e.g., user device 102 and/or devices 138, 150). This accessibility allows the information in the secure data record 126 to be verified and validated by any other devices in the network.

FIG. 2 illustrates an example of the secure data record 126 as a blockchain. A blockchain generally refers to a database shared by a plurality of devices (e.g. network devices 118 of FIG. 1) in a network. The data security system 100 may employ any suitable number of devices (e.g. network devices 118) to form a distributed network that maintains the secure data record 126 in the form of a blockchain, as illustrated in FIG. 2.

Each blockchain links together blocks 202*a-c* of data which includes identifiable data entries 204*a-c*, which represent portions of the data 128 stored in the secure data record 126. Data entries 204*a-c* may include information, one or more files, and/or any other suitable type of data. For example, a data entry 204*a-c* may include information associated with the user 170, such as location information, user device information, biometric information, employment records, educational records, personal information, and/or any other type of information.

Each block 202*a-c* in the blockchain includes a block identifier 206*a-c* and information derived from a preceding block 202*a-c*. For example, every block 202*a-c* in the blockchain includes a hash 208*a-c* of the previous block 202*a-c*. By including the hash 208*a-c*, the blockchain includes a chain of blocks 202*a-c* from a genesis block 202*a* (or a block not shown to the left of block 202*a* in the example of FIG. 2) to the latest block 202*c* (or a block not shown to the right of block 202*c* in the example of FIG. 2). Each block 202*a-c* is guaranteed to come after the previous block 202*a-c* chronologically (see time axis at bottom of FIG. 2) because the previous block's hash 208*a-c* would otherwise not be known. For example, a first block 202*a* may be created at a first time (or time period) 212, while subsequent second block 202*b* and third block 202*c* are created at subsequent second time 214 and third time 216, respectively.

In one embodiment, blocks 202*a-c* in a blockchain may be linked together by identifying a preceding block 202*a-c* with a cryptographic checksum (e.g. secure hash algorithm (SHA)-256) of its contents (e.g. the data entry 204*a-c* and additional metadata) which serves as each block's unique identifier. Links are formed by storing the cryptographic checksum identifier of one block 202*a-c* in the metadata of another block 202*a-c*, such that the former block 202*a-c* becomes the predecessor of the latter block 202*a-c*. In this way, the blocks 202*a-c* form a chain that can be navigated from block-to-block by retrieving the cryptographic checksum of a particular block's predecessor from the particular block's own metadata. Each block 202*a-c* is computationally impractical to modify once it has been in the blockchain because every block 202*a-c* after it would also have to be regenerated. These features protect data 204*a-c* (e.g., data 128 of FIG. 1) stored in the blockchain secure data record 126 from being modified by bad actors which provides further information security. When a network device 118 publishes an entry (e.g. one or more data entries 204a-c in a block 202a-c) in the secure data record 126, the blockchain for all other devices 118 in the distributed network is also updated with the new entry 204a-c. Thus, data 204a-c (e.g., data 128 of FIG. 1) published in a blockchain is available and accessible to every network device 118 with the secure data record 126. This allows the data 204a-c stored in the block 202a-c to be accessible for inspection and verification at any time by any device 118 with a copy of the secure data record 126.

In some embodiments, each block 202a-c may include a corresponding key 210a-c. The key 210a-c may be used to encrypt and/or decrypt data entries 204a-c or otherwise control access to data entries 204a-c. For example, a key 210a-c may be used to encrypt data (e.g., such that data 204a-c is encrypted data) stored in a block 202a-c. The key 210a-c may also be used to decrypt and recover the original data 204a-c (e.g., when combined with an access key 114, or a temporary access keys 146, 158, such that the data 128 in the secure data record 126 can be viewed). The key 210a-c may be any suitable type of encryption/decryption or hashing key as would be appreciated by one of ordinary skill in the art. In some embodiments, a key 210a-c may ensure that new data 160 cannot be stored in a block 202a-c unless an appropriate temporary access key 158 is presented. In this way only approved new data 160 from a data-providing device 150 that has an active temporary access key 158 can be stored in the secure data record 126.

Returning to FIG. 1, the data security system 100 may include a data-requesting device 138. The data-requesting device 138 is generally a device operated by a party (e.g., a third party separate from user 170) requesting to access at least a portion of the data 128 stored in the secure data record 126 or with whom a user 170 wants to share a portion of the data 128. For example, if a user 170 wants to provide access to a portion of the data 128 stored in the secure data record 126, the data security system 100 can facilitate this data sharing in a secure and efficient manner.

For example, if there is a request to share data 128 from the secure data record 126 with a third party associated with the data-requesting device 138, the user device 102 may present a user interface 110 that presents an option to allow or prevent data sharing (see FIG. 4B and corresponding description below). An input 172 provided by user 170 may indicate a selection of the option to allow sharing of the data 128 with the third party. Subsequently, the network device 118 can generate and provide a temporary access key 146 to the data-requesting device 138. As described in greater detail with respect to FIG. 4B below, in some cases, the user interface 110 may facilitate selection of a portion of the data 128 to provide as shared data 148. The temporary access key 146 may provide access to only the shared data 148 portion of the securely stored data 128. For example, the temporary access key 146 may be capable of only decrypting, or otherwise providing access to, the portion of the data 128 that corresponds to the selected shared data 148. In some cases, the input 172 may indicate a time limit within which the temporary access key 146 will remain active, such that after the time limit expires the shared data 148 can no longer be accessed using the temporary access key 146. Sharing data 128 with a data-requesting device 138 is described in greater detail below with respect to FIGS. 3 (see, e.g., steps 332 to 344) and 4B.

The example data-requesting device 138 of FIG. 1 includes a processor 140, memory 142, and a network interface 144. The processor 140 of the data-requesting device 138 includes one or more processors. The processor 140 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 140 may be a programmable logic device, a microcontroller, a microprocessor, or any suitable combination of the preceding. The processor 140 is communicatively coupled to and in signal communication with the memory 142 and network interface 144. The one or more processors are configured to process data and may be implemented in hardware and/or software. For example, the processor 140 may be 8-bit, 16-bit, 32-bit, 64-bit or of any other suitable architecture. The processor 140 may include an arithmetic logic unit (ALU) for performing arithmetic and logic operations, processor registers that supply operands to the ALU and store the results of ALU operations, and a control unit that fetches instructions from memory 142 and executes them by directing the coordinated operations of the ALU, registers and other components.

The memory 142 of the data-requesting device 138 is operable to store any data, instructions, logic, rules, or code operable to execute the functions of the data-requesting device 138. The memory 142 may store the temporary access key 146, shared data 148, and/or any other logic, code, and/or rules for implementing the functions of the data-requesting device 138. The memory 142 includes one or more disks, tape drives, or solid-state drives, and may be used as an over-flow data storage device, to store programs when such programs are selected for execution, and to store instructions and data that are read during program execution. The memory 142 may be volatile or non-volatile and may comprise read-only memory (ROM), random-access memory (RAM), ternary content-addressable memory (TCAM), dynamic random-access memory (DRAM), and static random-access memory (SRAM).

The network interface 144 of the data-requesting device 138 is configured to enable wired and/or wireless communications. The network interface 144 is configured to communicate data between the data-requesting device 138 and the network devices 118. The network interface 144 is an electronic circuit that is configured to enable communications between devices. For example, the network interface 144 may include one or more serial ports (e.g., USB ports or the like) and/or parallel ports (e.g., any type of multi-pin port) for facilitating this communication. As a further example, the network interface 144 may include a WIFI interface, a local area network (LAN) interface, a wide area network (WAN) interface, a modem, a switch, or a router. The processor 140 is configured to send and receive data using the network interface 144. The network interface 144 may be configured to use any suitable type of communication protocol as would be appreciated by one of ordinary skill in the art. The network interface 144 receives the temporary access key 146 and shared data 148 and provides the temporary access key 146.

In some embodiments, the data security system 100 may include a data-providing device 150. The data-providing device 150 is generally a device operated by a party (e.g., a third party separate from user 170) desiring to add new data 160 to the secure data record 126. For example, the data-providing device 150 may be operated by a trusted entity, such as a government agency or other established organization, that can provide trusted new data 160 and/or authentication evidence 116 that can be trusted to be authentic and accurate. For example, an agency tasked with generating government identity cards may operate a data-providing device 150 that can provide trusted authentication evidence 116 and/or new data 160. In some cases, trusted authentication evidence 116 is provided by the data-providing device 150 when the secure record 126 is initially created. In some cases, authentication evidence 116 is provided along with new data 160 to facilitate improved reliability of the new data 160.

After a request to store new data 160 from the third party in the secure data record 126, the user device 102 may present a user interface 110 with an option to allow or prevent storage of the new data 160 in the secure data record 126 (see FIG. 4A and corresponding description below). If an input 172 corresponding to a selection of the option to allow storage of the new data 160 is received, the new data 160 is stored in the secure data record 164, for example as a new entry (e.g., a block 202a-c of FIG. 2) in the secure data record 126. In order for the new data 160 to be stored in the secure data record 126, a temporary access key 158 may be provided to the data-providing device 150. The temporary access key 158 may allow the data-providing device 150 to add the new data 160 to the secure data record 126. In some cases, the input 172 may indicate a time limit within which the temporary access key 158 will remain active, such that after the time limit expires the new data 160 can no longer be added to the secure data record 126 using the temporary access key 158. Adding new data 160 to the secure data record 126 is described in greater detail below with respect to FIGS. 3 (see, e.g., steps 316 to 330) and 4A.

The example data-requesting device 150 of FIG. 1 includes a processor 152, memory 154, and a network interface 156. The processor 152 of the data-requesting device 150 includes one or more processors. The processor 152 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 154 and network interface 156. The one or more processors are configured to process data and may be implemented in hardware and/or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory 154 and executes them by directing the coordinated operations of the ALU, registers and other components.

The memory 154 of the data-requesting device 150 is operable to store any data, instructions, logic, rules, or code operable to execute the functions of the data-requesting device 150. The memory 154 may store the temporary access key 158, new data 160, authentication evidence 116, and/or any other logic, code, and/or rules for implementing the functions of the data-requesting device 150. The memory 154 includes one or more disks, tape drives, or solid-state drives, and may be used as an over-flow data storage device, to store programs when such programs are selected for execution, and to store instructions and data that are read during program execution. The memory 154 may be volatile or non-volatile and may comprise read-only memory (ROM), random-access memory (RAM), ternary content-addressable memory (TCAM), dynamic random-access memory (DRAM), and static random-access memory (SRAM).

The network interface 156 of the data-requesting device 150 is configured to enable wired and/or wireless communications. The network interface 156 is configured to communicate data between the data-requesting device 150 and network devices 118. The network interface 156 is an electronic circuit that is configured to enable communications between devices. For example, the network interface 156 may include one or more serial ports (e.g., USB ports or the like) and/or parallel ports (e.g., any type of multi-pin port) for facilitating this communication. As a further example, the network interface 156 may include a WIFI interface, a local area network (LAN) interface, a wide area network (WAN) interface, a modem, a switch, or a router. The processor 152 is configured to send and receive data using the network interface 156. The network interface 156 may be configured to use any suitable type of communication protocol as would be appreciated by one of ordinary skill in the art. The network interface 156 receives the temporary access key 158 and communicates the temporary access key 158, new data 160, and authentication evidence 116.

Example Operation of the Data Security System

FIG. 3 illustrates an example method 300 of operating the data security system 100 of FIG. 1. Various steps of the method 300 may be performed by the network devices 118 and/or the user device 102. For example, certain functions may be performed using the processor 104, memory 106, and network interface 108 of the user device 102 and/or the processor 120, memory 122, and network interface 124 of the network devices 118. The method 300 may begin at step 302 where it is determined whether the user 170 has requested to create a secure data record 126 or whether some other opt-in event has occurred. For example, the user 170 may provide an input 172 indicating a request to create a secure data record 126. As another example, the user 170 may navigate to website where they are prompted to create a secure data record 126 (e.g., to opt-in to creating a secure data record 126 to enable certain services).

At step 304, the secure data record 126 is created. For example, a new block 202a-c may be added to the secure data record 126 that will include information about the user 170. At step 306, a key 130 is generated for the secure data record 126. For example, a key 130 (e.g., a key 210a-c for a given block 202a-c of the secure data record 126) is created. At step 308, data that includes one or both of initial data 112 and new data 160 is received along with authentication evidence 116. For example, in some cases, initial data 112 may be provided by the user device 102 along with authentication evidence 116 from the user device 102. In some cases, new data 160 may be provided along with authentication evidence 116 from a data-providing device 150. This may provide improved reliability and security of the information stored in the secure data record 126, because the information from the data-providing device 150 may be trusted to a greater extent than information from the user device 102.

At step 310, a determination is made of whether the user 170 is authenticated. For example, the authentication evidence 116 may be reviewed to determine whether it is correct for a given user 170 (e.g., whether an identification number included in the authentication evidence 116 matches other known characteristics of the user 170, such as the location of the user device 102, the user's name, and the like). If authentication fails at step 310, updated authentication evidence 116 may be requested at step 312 before returning back to step 310. After authentication is successful at step 310, the method 300 proceeds to step 314 where the data (i.e., initial data 112 and/or new data 160) is stored in the secure data record 126. For example, data 204a-c may be stored in the block 202a-c created at step 204 (see also FIG. 2).

Steps 316 to 330 may be performed when there is a request for new data 160 to be added to the secure data record 126 from a data-providing device 150. For example, at step 316, a request to store new data 160 from a third party may be received. For example, a user input 172 may correspond to a request to store new data 160. In other cases, the request may be provided by the data-providing device 150. If such a request is received, the method 300 proceeds to step 318. Otherwise, the method 300 proceeds to step 332.

At step 318, storage instructions 134 are received. The storage instructions 134 may be provided via user input 172 at the user interface 110. FIG. 4A illustrates an example window 400 of the user interface 110 for approving or denying storage of new data 160 in the secure data record 126. The window 400 includes a selectable option 402 to authorize (by selecting "yes") or deny (by selecting "no") storage of the new data 160. The window 400 may include a field for indicating a time limit 404 for storing the new data 160 and/or a file location 406 where the new data 160 shored be saved at the network device 118 (e.g., in the memory 122). The time limit 404 and/or file location 406 may be included in the storage instructions 134.

Returning to FIG. 3, at step 320, a temporary access key 158 may be provided to the data-providing device 150 that will provide the approved new data 160. Temporary access key 158 may be a single-use access key that can be used a single time to provide new data 160 to the network device 118. For example, the temporary access key 158 may become inactive after a single use. As described above, the data-providing device 150 may use the temporary access key 158 to provide the new data 160 to the network device 118. At step 222, a determination is made of whether the new data 160 was received. If the new data 160 was not received, the network device 118 may determine whether a time limit has elapsed (e.g., time limit 404 of FIG. 4A) at step 324. If the time limit has not elapsed, the network device 118 returns to step 322 and continues to wait for the new data 160. Otherwise, if the time limit has elapsed, the temporary access key 158 may be rotated at step 326 to a new value to prevent further access of the secure data record 126 by the data-providing device 150.

Once the new data 160 is received at step 322, the network device 118 proceeds to step 328 where the secure data record 126 is updated to include the new data 160. For example, a new block 202a-c that includes the new data 160 as at least a part of data 204a-c may be added to the secure data record 126 (see FIG. 2). At step 330, the event record 136 is updated to indicate that the new data 160 was added to the secure data record 126. The event record 132 may also include a time that the new data 160 was added, an identifier of the third party associated with the new data 160, and any other information about the storage of the new data 160 in the secure data record 126.

Steps 332 to 344 may be performed when there is a request for a portion of the securely stored data 128 to be provided as shared data 148 to a data-requesting device 138. For example, at step 316, a request to store new data 160 from a third party may be received. For example, a user input 172 may correspond to a request to provide shared data 148. In other cases, the request may be provided by the data-requesting device 138. If such a request is received, the method 300 proceeds to step 334. Otherwise, the method 300 ends.

At step 334, sharing instructions 132 are received. The sharing instructions 132 may be provided via user input 172 at the user interface 110. FIG. 4B illustrates an example window 410 of the user interface 110 for approving or denying sharing of shared data 148. The window 410 includes selectable options 412a-c to authorize (by selecting the check box for a given file) or deny (by not selecting, or unselecting, a given check box) sharing of the data 128. The shared data 148 may correspond to the portion of the securely stored data 128 that is selected. The window 410 may include a field for indicating a time limit 414 for sharing the shared data 148 and/or an authorized recipient 416 of the shared data 148. The time limit 414 and/or recipient 416 may be included in the sharing instructions 132.

Returning to FIG. 3, at step 336, a temporary access key 146 may be provided to the data-requesting device 138 that is to receive the shared data 148. Similarly to the temporary access key 158, temporary access key 146 may be a single-use access key that can be used a single time to access shared data 148. For example, the temporary access key 146 may become inactive after a single use. As described above, the data-requesting device 138 may use the temporary access key 146 to obtain (e.g., decrypt, access, and/or the like) the portion of the data 128 corresponding to shared data 148. At step 338, a determination is made of whether the data sharing is complete (e.g., of whether the approved portion of the data 128 has been shared). If data sharing is not complete, the network device 118 may determine whether a time limit has elapsed (e.g., time limit 414 of FIG. 4B) at step 340. If the time limit has not elapsed, the network device 118 returns to step 338 and continues to wait for the data sharing to be completed. Otherwise, if the time limit has elapsed, the temporary access key 146 may be rotated at step 342 to a new value to prevent further access of the secure data record 126 by the data-requesting device 138.

Once the shared data 148 is received at the data-requesting device 138, the network device 118 proceeds to step 344 where the event record 136 is updated to indicate that the shared data 148 was shared from the secure data record 126. The event record 136 may also include a time that the shared data 148 was shared, an identifier of the third party that received the shared data 148, and any other information about the sharing of the shard data 148.

FIG. 4C illustrates an example window 420 of the user interface 110 when a user 170 views entries of the secure data record 126. The window 420 displays selectable files 422a,b. If a file 422a,b is selected a preview 424 of the file may be presented. This may allow a user 170 to rapidly view the file 422a,b without being required to open the file 422a,b with a separate program or application. The window 420 may also display information from the event record 136, such as, but not limited to, the file history 426, file source 428, creation date 430, storage date 432, and "shared with" information 434 shown in FIG. 4C. The file history 426 includes information about how a given file 422a,b has changed over time. The file source 428 identifies an original source of the data 128 included in the file 422a,b. The creation date 430 is the date the file 422a,b was created. The storage date 432 is the date the file 422a,b was stored in the secure data record 126. The "shared with" information 434 indicates which other parties have received the file 422a,b (e.g., as shared data 148).

While several embodiments have been provided in this disclosure, it should be understood that the disclosed system and method might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
    a network device comprising a memory operable to store a secure data record comprising a plurality of secure data entries, and a first processor communicatively coupled to the memory and configured to:
        receive data for storing in the secure data record and corresponding authentication evidence;
        determine, based on the authentication evidence, that the received data is authentic;
        after determining that the received data is authentic:
            encrypt the received data;
            generate a first key and a second key for decrypting the encrypted received data;
            generate a first entry in the secure data record, wherein the first entry comprises the encrypted received data and the first key; and
            provide the second key to a user device; and
    the user device in communication with the network device, the user device comprising a second processor configured to:
        cause presentation of a user interface comprising one or more selectable file names, the selectable file names corresponding to data entries of the secure data record;
        receive an input corresponding to a selection of a first file of the one or more selectable files, wherein the first file corresponds to at least a portion of the encrypted received data stored in the first entry of the secure data record;
        provide, to the network device, a request for the first file and the second key; and
        present the first file;
    wherein the first processor is further configured to:
        receive a request to share a portion of data from the secure data record with a third party;
        generate a temporary access key that is capable of decrypting only the portion of the data of the secure data record, wherein the temporary access key is a single-use access key that can be used a single time;
        share the portion of the data with the third party; and
        after a time limit has elapsed, rotate the temporary access key to a new value to prevent further access of the shared portion of data by the third party.

2. The system of claim 1, wherein the authentication evidence is received from the user device and corresponds to identifying information of a user of the user device.

3. The system of claim 1, wherein the authentication evidence is received from a third party and corresponds to identifying information of a user of the user device.

4. The system of claim 1, wherein, after a request is received to store new data from a third party in the secure data record:
    the second processor of the user device is further configured to:
        cause presentation of a user interface comprising an option to allow or prevent storage of the new data in the secure data record; and
        receive an input corresponding to a selection of the option to allow storage of the new data in the secure data record; and
    subsequently, the first processor of the network device is further configured to:
        receive the new data; and
        generate a new entry in the secure data record comprising the new data.

5. The system of claim 4, wherein:
    the user interface includes an entry for providing a time limit within which the new data can be stored in the secure data record; and
    after the time limit has expired, the new entry cannot be generated.

6. The system of claim 1, wherein, after a request is received to share data from the secure data record with a third party:
    the second processor of the user device is further configured to:
        cause presentation of a user interface comprising an option to allow or prevent sharing of the data with the third party; and
        receive an input corresponding to a selection of the option to allow sharing of the data with the third party; and
    subsequently, the first processor of the network device is further configured to:
        generate an access key for accessing the data in the secure data record; and
        provide the access key to the third party.

7. The system of claim 6, wherein the second processor of the user device is further configured to:
    cause presentation of a user interface comprising selectable portions of data to allow for sharing with the third party; and
    receive selection of a first portion of the selectable portions, wherein the access key provides access to the selected first portion of data in the secure data record.

8. The system of claim 6, wherein:
    the user interface includes an entry for providing a time limit within which the data can be shared with the third party; and
    after the time limit has expired, the data cannot be shared with the third party.

9. The system of claim 1, wherein the first processor of the network device is further configured to store, in the memory, an event record comprising a record of storage of data in the secure data record and sharing of data from the secure data record.

10. The system of claim 1, wherein the secure data record comprises a blockchain and the first entry is a block in the blockchain.

11. A method, comprising:
by a network device:
receiving data for storing in a secure data record and corresponding authentication evidence;
determining, based on the authentication evidence, that the received data is authentic;
after determining that the received data is authentic:
encrypting the received data;
generating a first key and second key for decrypting the encrypted received data;
generating a first entry in the secure data record, wherein the first entry comprises the encrypted received data and the first key; and
providing the second key to a user device; and
by a user device in communication with the network device:
causing presentation of a user interface comprising one or more selectable file names, the selectable file names corresponding to data entries of the secure data record;
receiving an input corresponding to a selection of a first file of the one or more selectable files, wherein the first file corresponds to at least a portion of the encrypted received data stored in the first entry of the secure data record;
providing, to the network device, a request for the first file and the second key;
presenting the first file;
receiving a request to share a portion of data from the secure data record with a third party;
generating a temporary access key that is capable of decrypting only the portion of the data of the secure data record, wherein the temporary access key is a single-use access key that can be used a single time;
sharing the portion of the data with the third party; and
after a time limit has elapsed, rotating the temporary access key to a new value to prevent further access of the shared portion of data by the third party.

12. The method of claim 11, wherein the authentication evidence is received from the user device and corresponds to identifying information of a user of the user device, or the authentication evidence is received from a third party and corresponds to identifying information of a user of the user device.

13. The method of claim 11, further comprising, after receiving a request to store new data from a third party in the secure data record:
by the user device:
causing presentation of a user interface comprising an option to allow or prevent storage of the new data in the secure data record; and
receiving an input corresponding to a selection of the option to allow storage of the new data in the secure data record; and
subsequently, by the network device:
receiving the new data; and
generating a new entry in the secure data record comprising the new data.

14. The method of claim 13, wherein:
the user interface includes an entry for providing a time limit within which the new data can be stored in the secure data record; and
after the time limit has expired, the new entry cannot be generated.

15. The method of claim 11, further comprising, after a request to share data from the secure data record with a third party:
by the user device:
causing presentation of a user interface comprising an option to allow or prevent sharing of the data with the third party; and
receiving an input corresponding to a selection of the option to allow sharing of the data with the third party; and
subsequently by the network device:
generating an access key for accessing the data in the secure data record; and
providing the access key to the third party.

16. The method of claim 15, further comprising, by the user device:
causing presentation of a user interface comprising selectable portions of data to allow for sharing with the third party; and
receiving selection of a first portion of the selectable portions, wherein the access key provides access to the selected first portion of data in the secure data record.

17. The method of claim 15, wherein:
the user interface includes an entry for providing a time limit within which the data can be shared with the third party; and
after the time limit has expired, the data cannot be shared with the third party.

18. The method of claim 11, further comprising, by the network device, storing an event record comprising a record of storage of data in the secure data record and sharing of data from the secure data record.

19. A user device, comprising:
a network interface operable to communicate with a network device storing a secure data record comprising a plurality of secure data entries; and
a processor communicatively coupled to the network interface and configured to:
provide authentication evidence to the network device;
cause presentation of a user interface comprising one or more selectable file names, the selectable file names corresponding to data entries of the secure data record;
receive an input corresponding to a selection of a first file of the one or more selectable files, wherein the first file corresponds to at least a portion of the encrypted received data stored in the first entry of the secure data record;
provide, to the network device, a request for the first file and a key for decrypting the first file;
present the first file;
receive a request to share a portion of data from the secure data record with a third party;
generate a temporary access key that is capable of decrypting only the portion of the data of the secure data record, wherein the temporary access key is a single-use access key that can be used a single time;
share the portion of the data with the third party; and
after a time limit has elapsed, rotate the temporary access key to a new value to prevent further access of the shared portion of data by the third party.

20. The user device of claim 19, wherein, after a request to share data from the secure data record with a third party, the processor is further configured to:
- cause presentation of a user interface comprising an option to allow or prevent sharing of the data with the third party, electable portions of data to allow for sharing with the third party, and an entry for providing a time limit within which the data can be shared with the third party, wherein, after the time limit has expired, the data cannot be shared with the third party;
- receive an input corresponding to a selection of the option to allow sharing of the data with the third party;
- receive selection of a first portion of the selectable portions, wherein the access key provides access to the selected first portion of data in the secure data record; and
- receive a selection of the time limit.

* * * * *